April 21, 1964  E. L. CLEMENTS  3,129,779
WEIGHING AND DISCHARGE APPARATUS
Filed Oct. 16, 1959  2 Sheets-Sheet 1
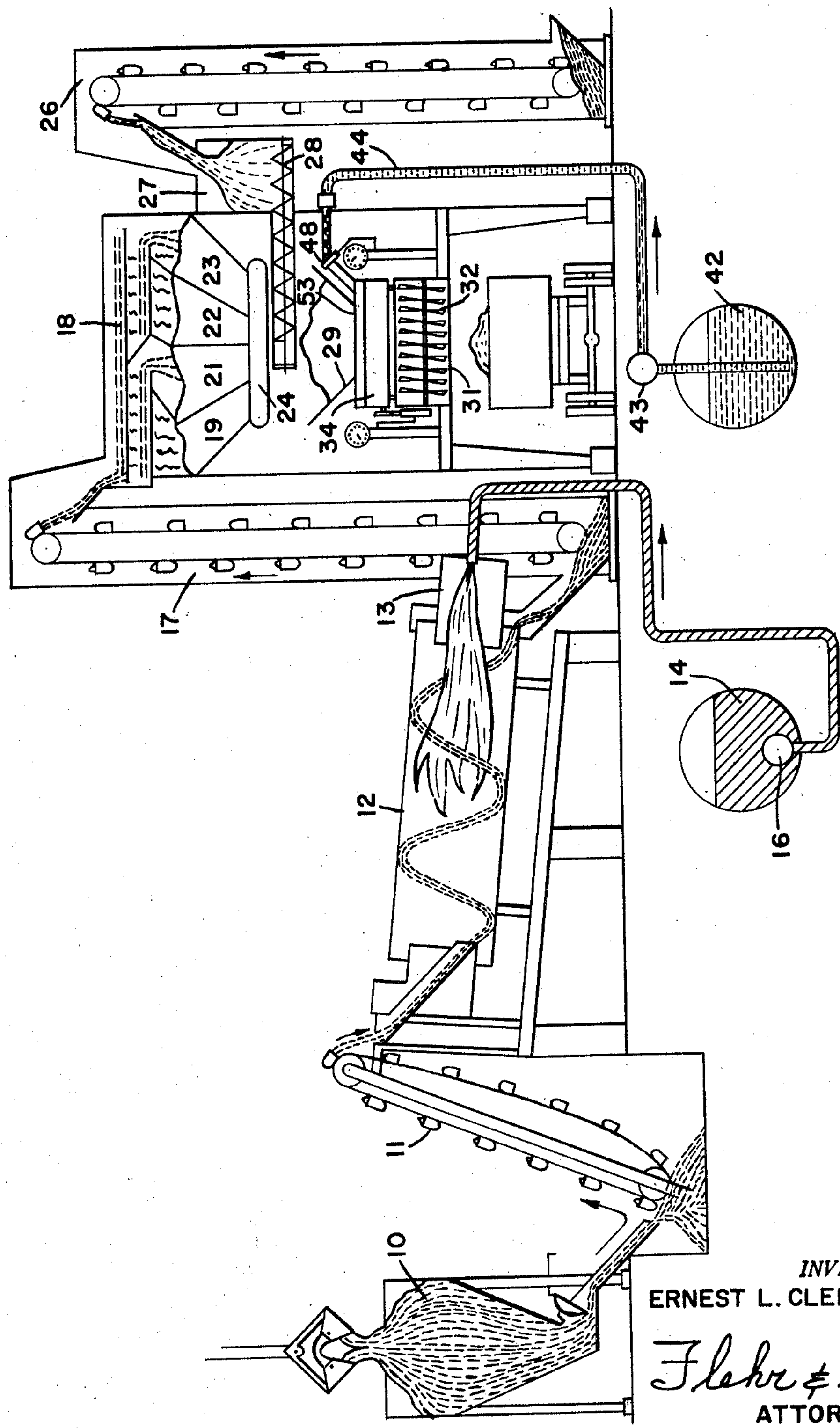
INVENTOR.
ERNEST L. CLEMENTS
Flehr & Swain
ATTORNEYS WEIGHING AND DISCHARGE APPARATUS
Filed Oct. 16, 1959
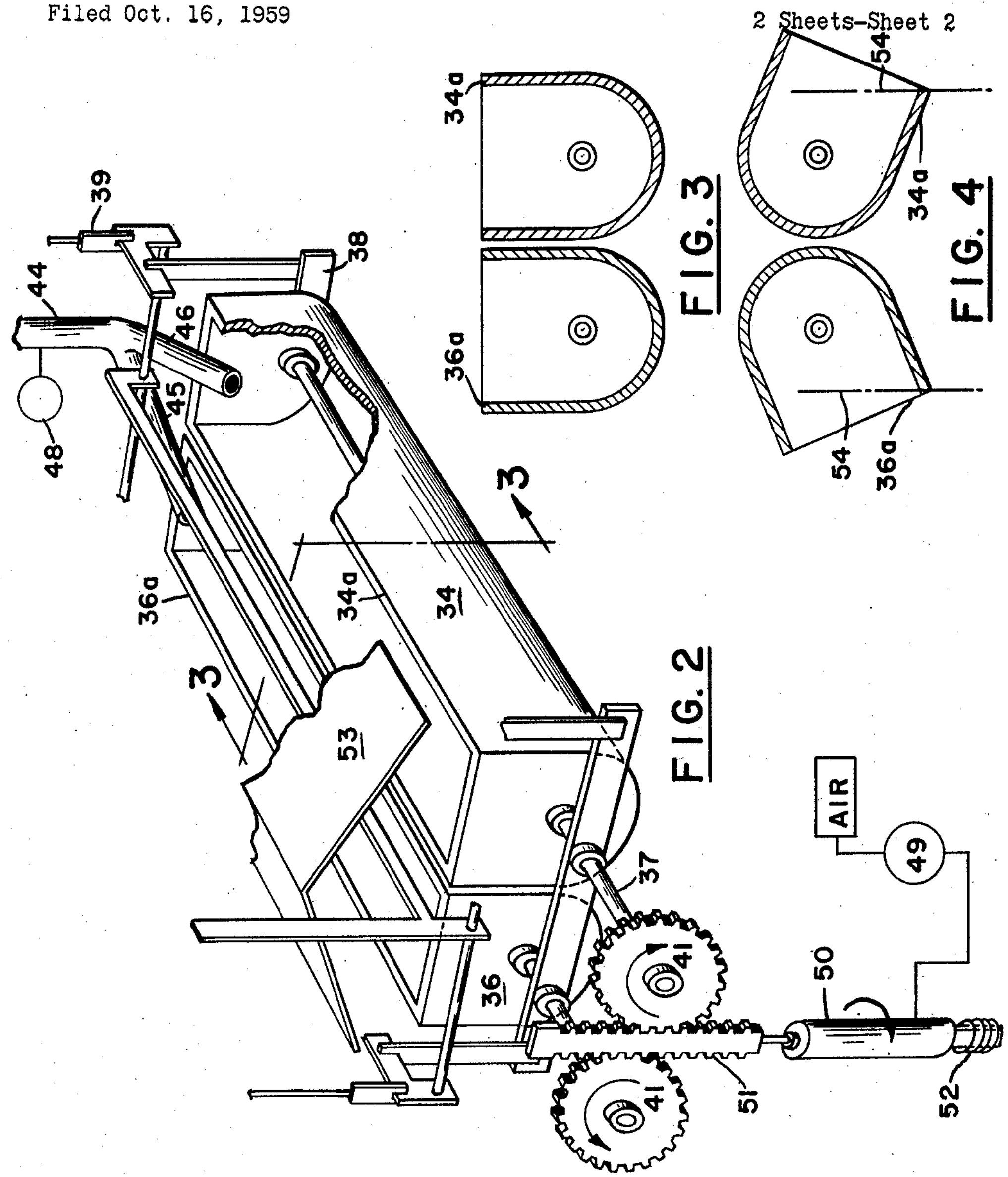
*INVENTOR.*
ERNEST L. CLEMENTS
*BY*
Flehr & Swain
ATTORNEYS United States Patent Office 3,129,779

Patented Apr. 21, 1964

3,129,779

WEIGHING AND DISCHARGE APPARATUS

Ernest L. Clements, 37350 Sequoia Road, P.O. Box 667, Fremont, Calif.

Filed Oct. 16, 1959, Ser. No. 847,008
3 Claims. (Cl. 177—114)

This invention relates to weighing and discharge apparatus and particularly to apparatus for weighing and discharging asphalt into a mixer in an asphalt plant.

The production of asphalt from raw materials to finished mix requires strict control as well as speedy operation. An ideal asphalt plant is one in which every unit is engineered to speed the flow, cut man hours per batch and reduce the lag time between batches. Various methods of providing larger drier capacity, larger elevators, extra large vibrating screens, and air handling systems have been utilized. However, the method of weighing and discharging asphalt in even the most modern plant leaves much to be desired.

For example in a conventional plant the asphalt is weighed and then discharged into one end, for example, of the mixer. It is a particular object of this invention to provide a weighing and discharge mechanism in which asphalt will be discharged uniformly over the mix in the mixer.

Further, in a conventional asphalt plant the weighing and discharge apparatus has proved to be a bottle-neck in the otherwise speedy operation of the plant and it is an object of this invention to provide a weighing and discharge apparatus which will operate quickly and accurately. For example it is a particular object of this invention to provide a weighing device into which asphalt may be introduced prior to the time when it is to be utilized and from which the asphalt may be uniformly and speedily discharged into the mixer in the shortest period of time to achieve a thorough and quick mix.

These and other objects and advantages of this invention will appear from the following specification taken in conjunction with the accompanying drawing in which:

FIGURE 1 represents a schematic view of a typical asphalt plant in which my weighing and discharge apparatus has been utilized and, FIGURE 2 represents a three-quarters elevational front view of my weighing and discharge apparatus, and FIGURE 3 represents a cross-sectional detail taken along the line 3—3 of FIGURE 2, and FIGURE 4 represents an end view of the device illustrated in FIGURE 3 showing the same in discharge position.

FIGURE 5 represents an end view of a portion of the apparatus illustrated in FIGURE 1.

As illustrated in FIGURE 1, a conventional asphalt plant consists of suitable storage and feeder bins 10 in which cold raw aggregates are stored and from which they are carried by an elevator 11 to a drier 12 which, in this particular instance, is a rotating cylindrical shell with lifting flights attached to the inside wall thereof to cascade the aggregates, exposing them to the heat produced by the burner 13 which is oil fired from tank 14 by pump 16. The dried 12 removes the moisture and brings the aggregate to the desired temperature. The heated aggregate is then hoisted by an elevator 17 and discharged onto a vibrating screen 18 which separates the aggregates according to size in the proper compartments 19, 21, 22 and 23, in the aggregate storage bin 24.

Simultaneously, mineral filler of any suitable type may be introduced into the lower end of elevator 26 and be discharged into bin 27. The elevator 26 is of the bucket type and the mineral filler may be either stone dust, lime dust, or cement, for example. The bin 27 is preferably adapted to hold a sizeable quantity of predetermined mineral filler permitting the operator to batch predetermined weights into the aggregate weighing hopper 29 by means of a motor driven screw conveyor 28.

The aggregate weighing hopper 29 is suspended on separate scales which register an exact predetermined weight of each size of aggregate withdrawn from the storage bin 24 together with filler from bin 27. When a predetermined quantity of aggregate and filler has been introduced into the hopper 29, further flow of aggregate or filler is terminated and the weighed mass is discharged into the mixer 31. The mixer 31 is preferably of the twin pug-mill type and is provided with revolving paddles 32 which mix the aggregates and the liquid asphalt into batches as proportioned by the operator.

In a conventional asphalt plant the asphalt is discharged into one end of the pug-mill in a predetermined weighed amount.

However, I have found that the conventional weighing and discharge apparatus is slow and serves to act as a bottleneck in the production of asphalt from a typical plant.

The weighing and discharge device which I utilize is positioned immediately above the mixer 31 and serves to discharge a predetermined quantity of liquid asphalt into the mixer uniformly. As illustrated particularly in FIGURE 2, my apparatus consists of a pair of elongated kettle members 34 and 36 which are rotatably mounted upon shafts 37. The shafts are journaled in a framework 38 which is attached by scale lever arms 39 to a weighing apparatus.

Identical gears 41 are keyed to the ends of the shafts 37 and rotation of the gears causes rotation of the shafts 37 and the kettles 34 and 36 about the longitudinal axis of the shafts 37. The asphalt is fed from a tank 42 by means of a pump 43 through a conduit 44, which is split into two branches 45 and 46 into the kettles 34 and 36, respectively. As the quantity of asphalt which is discharged into the kettles increases in weight, this is transmitted through the scale arms 39 to a scale, not shown, which is designed to actuate a valve 48 which terminates the flow of asphalt from conduit 44. An operator then operates a second valve 49 which actuates air ram 50 and serves to actuate a toothed rack 51 against the tension of a spring 52. Actuation of the rack 51 causes the gears 41 to rotate and discharge the contents of the kettles 34 and 36. When the contents of the kettles 34 and 36 have been discharged, the valve 49 is deactivated and the ram 50 is evacuated with the result that the kettles 34 and 36 are returned to operating position under the effect of spring 52.

It should be pointed out that the kettles 34 and 36 are of approximately the same length as the mixer 31 so that material which is discharged from the kettles 34 and 36 will be discharged along the entire length of the mixer 31. It should also be pointed out that when the kettles 34 and 36 are tipped about the axes of the shafts 37 the lips **34*a* and 36*a* lie in the general vertical plane 54 defined by the shafts of the revolving paddles 32 in the mixer 31**.

The entire assembly is covered by a hood 53 which lies under the weighing hopper 29. The contents of the weighing hopper 29 are diverted by the hood 53 into the mixer 31. It will be apparent from the foregoing therefore that the contents of the weighing hopper are discharged therefrom and are diverted by the hood 52 generally to a zone immediately overlying the paddles 32 in the mixer 31. Also the hot liquid asphalt in the kettles 34 and 36 is discharged over the lips **34*a* and 36*a*** into substantially the same area. In this way a rapid and intimate mix of the products is obtained.

It is apparent that while one batch is in the mixer further hot liquid asphalt can be introduced into the kettles 34 and 36 through the conduit 44.

Operation of the device may briefly be described as follows: The proper quantities of aggregate and of mineral filler are mixed and introduced into the weighing hopper 29. When the proper quantity has been accumulated therein introduction of more aggregate and mineral filler is terminated and the quantity in the hopper 29 is discharged therefrom over the hood 53 into the mixer 31 generally in the zone overlying the two sets of paddles 32. Hot asphalt has meantime been introduced into the kettles 34 and 36. When a predetermined weighed quantity has been introduced therein the valve 48 is closed and the further introduction of asphalt into the kettles 34 and 36 is terminated. An operator may then actuate the valve 49, and introduce air into the ram 50, which, as has previously been described, will serve to tip the kettles 34 and 36 and discharge the contents therefrom. When the contents have been discharged therefrom the entire assembly may be returned to normal hot asphalt receiving position and the cycle begun again.

I claim:

1. In a mixing system of the type described, apparatus including, in combination, an elongated mixer, and discharge apparatus for measuring a predetermined weight of liquid and evenly discharging the measured liquid into said mixer, said discharge apparatus comprising a pair of elongated kettles mounted above and overlying said mixer in parallel relation thereto, means supporting said kettles for vertical weighing movement and for rotation about their longitudinal axes, drive mechanism coupled to said kettles to rotate same about their longitudinal axes in opposite directions wherein the tops of said kettles rotate respectively away from each other to discharge the contents thereof into and distribute same along the length of said mixer, and fluid transfer means for delivering fluid into said kettles.

2. A mixing system as defined in claim 1 wherein said mixer is coextensive in length with the kettles whereby even and complete distribution of the mixing materials is obtained.

3. A mixing system as defined in claim 1, wherein said mixer comprises an open-topped elongated container and having a plurality of paddles mounted for rotation about an axis disposed longitudinally of said mixer.

References Cited in the file of this patent

UNITED STATES PATENTS

| | | |
|---|---|---|
| 252,297 | Smyth | Jan. 19, 1882 |
| 320,338 | Dawson | June 16, 1885 |
| 729,623 | Marsh | June 2, 1903 |
| 1,386,193 | Meguiar | Aug. 2, 1921 |
| 1,849,984 | Koch | Mar. 14, 1932 |
| 2,089,534 | Carlson | Aug. 10, 1937 |
| 2,398,887 | Drinnon | Apr. 23, 1946 |
| 2,540,431 | Davis | Feb. 5, 1951 |